Figure 1:
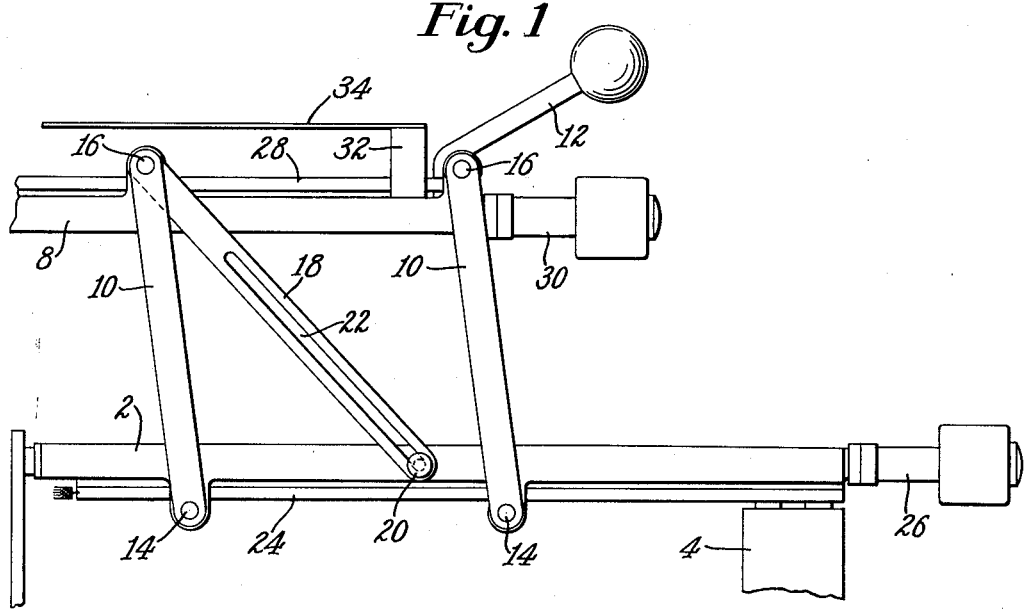

April 17, 1962  C. H. ANNISS ET AL  3,030,484
HEATING APPARATUS FOR SHOEMAKING
Filed Dec. 23, 1959  2 Sheets-Sheet 1

*Inventors*
Charles H. Anniss
Agoston Zoltan Kiss
By their Attorney
George C. Fuller

United States Patent Office

3,030,484
Patented Apr. 17, 1962

3,030,484
HEATING APPARATUS FOR SHOEMAKING
Charles Harry Anniss, Leicester, and Agoston Zoltan Kiss, Richmond, England, assignors to United Shoe Machinery Corporation, Flemington, N.J., a corporation of New Jersey
Filed Dec. 23, 1959, Ser. No. 861,670
Claims priority, application Great Britain Jan. 3, 1959
2 Claims. (Cl. 219—19)

This invention relates to improvements in heating apparatus suitable for use in attaching soles on shoes.

More particularly, the illustrative heating apparatus is adapted for use with a moulding and vulcanizing press and is organized for preheating in operational concord, the bottoms of lasted shoes and a mass of material consisting of unvulcanized rubber in the form of shoe sole and heel blanks, this preheating taking place preparatory to the material being introduced for treatment in the moulding and vulcanizing press by which eventually the material (as moulding and vulcanizing occur when the press is in operation) is united direct to the shoes to form soles thereon. The term "shoe" is used herein generically as including outer footwear generally.

In the production of shoes having soles and heels moulded on to their uppers by means of a moulding and vulcanizing press, it is of importance from the point of view of production economy that a moulding and vulcanizing cycle of the press shall take place as quickly as possible. It has been found in practice that, according to the type of sole required, a usual time interval required to mould and vulcanize a rubber sole to a shoe is from eight to twelve minutes. This time interval includes the time required to raise the temperature of the unvulcanized rubber blank from the temperature it possesses when introduced into the press, i.e. atmospheric or room temperature to a temperature at which a satisfactory vulcanization can occur which may be in the region of 120° C.

Various arrangements of heaters associated with the moulds in moulding and vulcanizing presses have proved generally satisfactory in raising the temperature of blanks to a satisfactory degree but it has been found necessary to limit the temperature to which the moulds are heated in order that the blanks may be heated comparatively slowly as the blanks are usually heated from one side only with a heated mould arrangement and if heated rapidly the surface region of a blank located nearest to the source of heat may become vulcanized prior to the remainder of the blank becoming heated to a satisfactory degree. From what has been said it will be appreciated that a considerable proportion of the time taken for an operative cycle of a moulding and vulcanizing press is taken up in heating the unvulcanized rubber to a temperature at which a satisfactory vulcanization can take place.

By preheating rubber or rubber type sole and heel blanks before introducing them into a moulding and vulcanizing press the time required to mould and vulcanize them to shoes may be reduced by a considerable amount. If the blanks can be heated satisfactorily up to about the vulcanizing temperature immediately prior to their introduction to the press the cycle time may even be halved. It is desirable, under optimum conditions to effect the preheating of the rubber blanks to the desired temperature in a time not longer than this "reduced" cycle time of the press. Because of the poor heat conductivity of the material the use of a simple heated plate for heating the blanks from one side is unlikely to be very satisfactory.

A heating device which operates on the so-called dielectric high frequency principle, while satisfactory in heating blanks sufficiently in a comparatively short interval of time, requires rather specialized and expensive apparatus.

An object of the present invention is to provide a simple inexpensive and convenient apparatus suitable for preheating, in a relatively short time interval, the bottoms of lasted shoes and unvulcanized blanks of rubber or rubber type material to a temperature approaching the desired vulcanizing temperature prior to the introduction of the blanks to a moulding and vulcanizing press on which the said apparatus is mounted.

To this end, and in accordance with a feature of the invention, there is provided heating apparatus comprising a pair of plates adapted for movement into superimposed disposition to engage opposite surfaces of such flat workpieces as unvulcanized blanks, means for heating at least the upper plate of said pair, and a shelf adapted to receive shoes in bottom-down disposition secured to the upper plate.

Since the apparatus is also adapted for use in activating the adhesive on a conventional sole by heat from the upper plate while the shoe bottoms are also heated for conventional forms of sole attaching, it is contemplated that in such a mode of operation only the upper plate need be heated.

In accordance with a further feature of the invention, a parallel linkage is provided between the plates whereby the operator can separate the plates by pushing a handle to insert or remove workpieces without disrupting the attitude of the shelf and thereby causing the shoes to fall off it.

Thus the apparatus provides a convenient means for heating both the soling material and the mating bottom surfaces of shoes in convenient proximity while affording ready access to the respective shoe parts.

Figure 2:
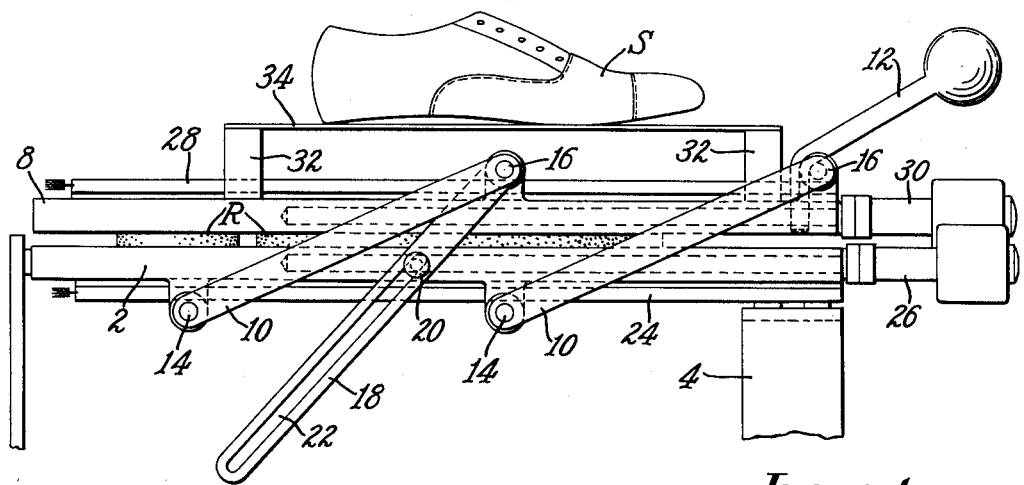
Figure 3:
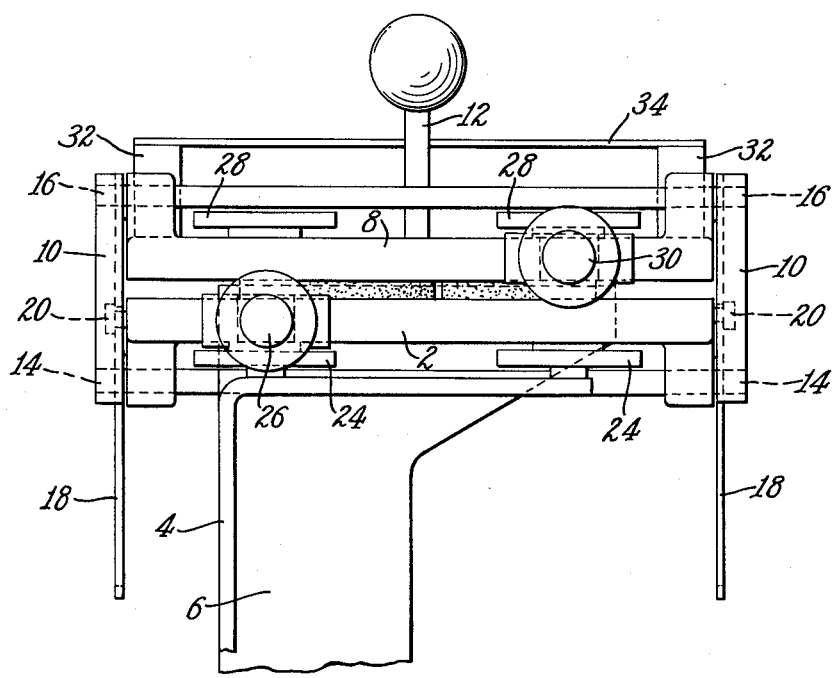

Other features and advantages of the invention will best be understood from the following description taken in conjunction with the accompanying drawings, in which, FIG. 1 is a left side elevation of apparatus embodying the present invention, the said apparatus being partly broken away and shown in an open position ready to receive unvulcanized rubber blanks;

FIG. 2 is a view similar to FIG. 1 but with the parts of the illustrative apparatus shown in operative positions; and FIG. 3 is a front elevation of the illustrative apparatus and showing the parts in operative positions.

The illustrative apparatus is organized for preheating a mass of material consisting of unvulcanized rubber in the form of sole and heel blanks R and comprises a lower plate 2, preferably made of aluminum, adapted to be attached by suitable brackets 4 and 6 to the right-hand side of a moulding and vulcanizing press of the aforementioned type, the height of the lower plate from the ground being conveniently some 4½ feet.

Superposed above the lower plate 2 is a top plate 8, also preferably made of aluminum, the top plate 8 being connected to the plate 2 by four parallel links 10. A handle 12 is secured to the front end, i.e. the nearest end to an operator, of the top plate 8. The arrangement is such that the top plate 8 may be raised, while remaining parallel to the lower plate 2, by an operator pushing on the handle 12 whereby the links 10 are caused to move upwardly and rearwardly about their pivotal connections 14 and 16 to the lower plate and top plate respectively. The plates may be suitably treated, if desired, to prevent the heated blanks from sticking to them.

A pair of locking links 18 are pivoted on the more rearward of the pivots 16 on either side of the top plate 8. Pins 20 in either side of the lower plate 2 pass through slots 22 extending along the links 18. Heads on the pins 20 restrain the links 18 between the heads and side portions of the lower plate 2. The arrangement is such that when the top plate 8 is raised and moved rearwardly the pins 20 act as stops and hold the top plate in a convenient raised and rearwards position by engaging the links 18 at the ends of the slots 22. When the top plate 8 is in its raised position the locking links 18 are positioned diagonally between each pair of parallel links 10 and hold the top plate in a gravitationally stable position with the links 10 over center.

A pair of strip resistance heaters 24 are arranged side by side and mounted on the underside of the lower plate 2. A thermostat control 26 associated with said heaters is attached in the plate 2.

A pair of strip resistance heaters 28 are arranged side by side and mounted on the upper surface of the top plate 8. A thermostat control 30 associated with said heaters is attached in the top plate 8. The arrangement is such that the heaters of both plates are connected to a suitable supply of electricity for heating the plates 2 and 8, the thermosats serving to control the temperature of each plate independently according to operational requirements and heat losses from each plate. Suitably the plates may be heated to about 100° C.

Four lugs 32 project upwardly from the top plate 8 and have secured thereon a shelf 34, suitably in the form of an open grid. In operation, with the top plate 8 in the position shown in FIG. 1, two sole and heel blanks R (FIGS. 1 and 2) may be placed side by side on the lower plate 2. By pulling on the handle 12 the top plate may be lowered, the pin and slot connections in the locking links 18 enabling those links to move downwardly with the plate 8, until it rests on the top surface of the blanks. As both the top and lower plates are heated the rubber blanks may be heated from both sides simultaneously. A pair of lasted shoes S (FIG. 2) may be placed side by side on the shelf 34, heat from the heaters 28 being sufficient to heat the shoe bottoms.

From the foregoing description it will be seen that the rubber blanks, irrespective of their thickness, are contacted uniformly on both upper and lower surfaces, by heated plates capable of being uniformly heated thus reducing the danger of localized overheating and therefore the danger of the blanks becoming partly vulcanized before being introduced into a moulding and vulcanizing press.

Where outsoles are to be bonded to shoes in the conventional cement shoe press, the adhesive on the margin of the outsole may be activated by disposing the outsoles on the lower plate with the adhesive side up and the upper plate, which now need be the only heated plate, brought into close proximity or contact with the adhesive on the sole. Meanwhile, the bottoms of the shoes may be heated by placing the shoes on the shelf so that a poor bond will not be created by subsequent heat transfer from the adhesive on the sole to a cold shoe bottom.

Having thus described our invention, what we claim as new and desire to secure by Letters Patent of the United States is:

1. Apparatus for heating work pieces comprising a rectangular fixed plate, a rectangular movable plate, said plates each having a flat work engaging surface, parallel linkage means connecting said plates with their work engaging surfaces in opposed relation, said means comprising four links of equal length extending between pivot points at the fixed and movable plate, the fixed pivot points of the links lying in a plane parallel with the work contacting surface of the fixed plate and the moving pivot points of the links lying in a plane parallel with said surface, the moving points being offset forwardly of the fixed points when the plates are adjacent whereby when the moving plate is raised it moves upwardly and rearwardly, means for heating said plates, and a shelf secured to said movable plate in spaced relation therewith.

2. Apparatus for heating work pieces comprising a rectangular fixed plate, a rectangular movable plate, said plates each having a flat work engaging surface, parallel linkage means connecting said plates with their work engaging surfaces in opposed relation, said means comprising four links of equal length extending between pivot points at the fixed and movable plate, the fixed pivot points of the links lying in a plane parallel with the work contacting surface of the fixed plate and the moving pivot points of the links lying in a plane parallel with said surface, the moving points being offset forwardly of the fixed points when the plates are adjacent whereby when the moving plate is raised it moves upwardly and rearwardly, a locking link operative to prevent movement of the movable plate beyond a position in which the said four links are over center whereby to retain the movable plate in a gravitationally stable position, means for heating said plates, a shelf secured to said movable plate in spaced relation therewith, and a handle secured to said movable plate whereby the operator can separate the plate by pushing said handle.

References Cited in the file of this patent

UNITED STATES PATENTS

| | | |
|---|---|---|
| 1,778,263 | Lamb | Oct. 14, 1930 |
| 2,186,941 | Teppema et al. | Jan. 16, 1940 |
| 2,523,641 | Alvarez | Sept. 26, 1950 |
| 2,582,464 | Small | Jan. 15, 1952 |
| 2,613,307 | Mirand | Oct. 7, 1952 |
| 2,657,029 | Smith | Oct. 27, 1953 |
| 2,834,395 | Russell et al. | May 13, 1958 |